UNITED STATES PATENT OFFICE.

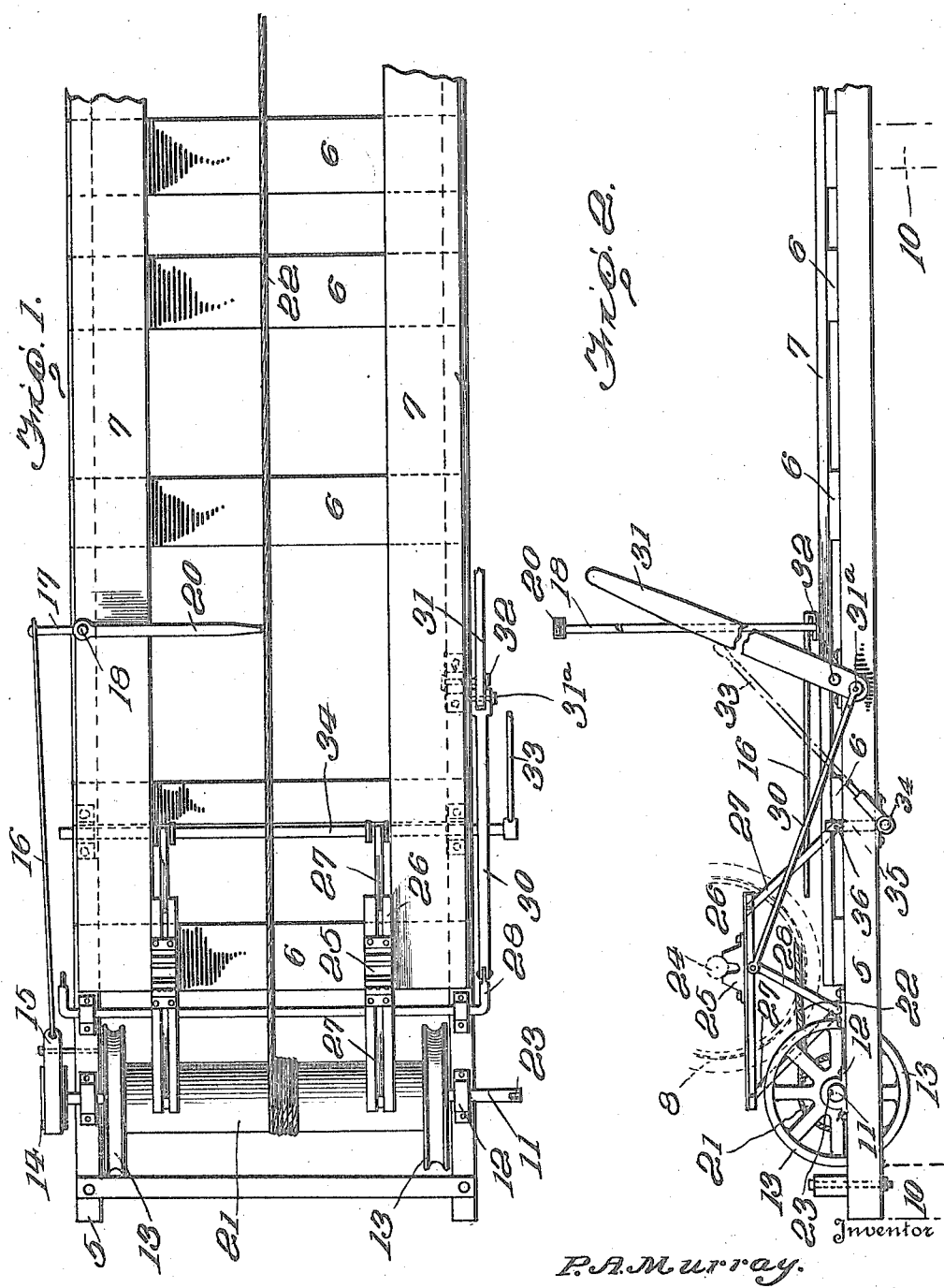

PRESTON A. MURRAY, OF POMONA, CALIFORNIA.

POWER-TRANSMISSION APPARATUS.

1,248,697.  Specification of Letters Patent.  Patented Dec. 4, 1917.

Application filed January 9, 1917. Serial No. 141,393.

*To all whom it may concern:*

Be it known that I, PRESTON A. MURRAY, a citizen of the United States, residing at Pomona, in the county of Los Angeles and State of California, have invented certain new and useful Improvements in Power-Transmission Apparatus, of which the following is a specification.

This invention relates to a power transmitting device and more particularly to one adapted to be used in conjunction with an automobile for obtaining power from the engine of the automobile and transmitting it to a part adapted to be actuated upon. While the present invention will hereinafter be described with relation to its application to a hoisting mechanism, it is, of course, to be understood that the power obtained from the automobile engine may be transmitted for other purposes without material modification.

One of the objects of the present invention is to provide a reliable and efficient power transmitting mechanism or attachment for automobiles of simple and practical construction. A further object is to provide a device of the above character having few parts which will be relatively inexpensive to install and manufacture. A further object is to provide a device of the above character having the parts so positioned and arranged as to be under control of a single operator.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawing, like characters of reference denote corresponding parts throughout all the views, of which:—

Figure 1 is a plan view of the complete apparatus; and

Fig. 2 is a side elevation thereof.

Referring now to the drawings in detail, 5 denotes a pair of longitudinally disposed side members connected securely by transverse members 6 at intervals, as may be necessary. Runways 7 are supported above the transverse member 6 for supporting an automobile, the rear driving wheel of which is indicated at 8. This entire platform may be supported from legs 10 adapted to rest on the ground and the forward or righthand end, as shown in the drawings, is provided with an inclined runway, not shown, whereby the automobile may be backed up onto the platform.

Located at the rear or lefthand end of the platform is a driven shaft 11 mounted in suitable bearings 12 on the platform. Within the side members 5 are positioned a pair of grooved wheels 13 which are adapted to coact with driven wheels 8 of the automobile when lowered into operative engagement therewith by mechanism hereinafter described. The shaft 11 is provided at one end with a brake pulley 14 about which a brake band 15 passes. The end of this band is connected by means of pull rod 16 to a bell crank lever 17 pivoted at 18 to the side of the platform. This pivot is really a vertically disposed rod, as shown more clearly in Fig. 2, provided at its upper end with a handle or operating lever 20 extending across the machine when in operative position to a point where it may be easily operated by a person sitting in the driver's seat. Between the driven wheels 13 is a drum 21 upon which a rope or cable 22 leading to the forward or righthand end of the platform may be wound. It is also to be noted that the shaft 11 is provided at one end with a slot 23 adapted to receive a pulley or tool, not shown, in case other form of power is adapted to be obtained. For instance, a grindstone might be applied to this shaft or an ordinary pulley and belt leading to a saw mill.

When the automobile is in operative position, the rear axle 24 carrying the wheels 8 is supported in a saddle 25 mounted upon longitudinally disposed members 26 supported by pivotal links 27 at its opposite ends. Connected with these links is a rod 28 having its upper end connected by a link 30 to the lower end of an operating lever 31 pivoted in fixed bearings 32 on the side frame of a machine. Thus, as the lever 31 is moved rearwardly or toward the left, a downward pull will be exerted upon the link 30 which will raise the rear axle 24 and its wheel 8 out of engagement with the driven wheels 13. In order to position the automobile upon the lifting jack, a lever 33 which is pivoted at 34 to the stringer 5 is swung rearwardly or toward the left. A link 35 is connected with the pivot shaft 34 and in the position shown in Fig. 2 is held in vertical position by means of the transverse tie 6. The upper end of this link 35 is pivotally connected at the point 36 with the lower end with one of the links 27. Now, as this lever 33 is swung toward the left the parts 35 and 27 which constitute a toggle will be moved past a dead center position which will lower the righthand end of the members 26. The automobile may then be backed into a position over the jack and on reverse movement of the lever 33, the wheel will be lifted clear of the platform. Then by operating the lever 31, the rear wheels may be brought into and out of engagement with the driving wheels 13, as desired.

It is believed that the method of use and operation of an apparatus of this character will be clear from the above disclosure. It may be stated, however, that the automobile is positioned in the manner immediately above described and the operator sitting in the driver's seat may control not only the running of the engine in the usual manner, but also the engagement and disengagement of the driving wheels with the grooved wheels 13. For instance, when the apparatus is being used as a hoisting apparatus, the cable which passes beneath the car to a shaft located in view of the driver may be wound upon the drum 21 to hoist the bucket and when it is desired to lower the bucket the lever 31 is moved rearwardly which carries the driving wheel 8 out of engagement with the driven wheel 13 and the lever 20 moved as may be necessary to control the brake device upon the winding drum.

It is thus seen that the present invention provides a simple and practical device of the above character which may be controlled by one person sitting in the driver's seat.

The invention is believed to be practical and simple in construction and adapted to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. In an apparatus of the character described, in combination, a platform adapted to support an automobile, a driven shaft mounted upon the platform, wheels carried by said shaft adapted to coact with the driven wheels of the automobile, means for raising and lowering the automobile out of contact with the platform controlled from the driver's seat, and means for raising and lowering the wheels of the automobile into and out of contact with the driven wheels by means operable from the driver's seat.

2. In an apparatus of the character described, in combination, a platform adapted to support an automobile, a driven shaft mounted upon the platform, wheels carried by said shaft adapted to coact with the driven wheels of the automobile, means for raising and lowering the automobile out of contact with the platform controlled from the driver's seat, means for raising and lowering the wheels of the automobile into and out of contact with the driven wheels by means operable from the driver's seat, and a brake device associated with the driven shaft operable from the driver's seat.

3. In an apparatus of the character described, in combination, a platform adapted to support an automobile, a transverse shaft, driven wheels thereon adapted to coact with the driving wheels of the automobile, a drum carried by said driven shaft, a brake device upon said driven shaft, and a jack operable from the driver's seat for raising and lowering the automobile wheels with respect to the platform and also with respect to the driven wheels.

4. In an apparatus of the character described, in combination, a platform adapted to support an automobile, a transverse shaft, driven wheels thereon adapted to coact with the driving wheels of the automobile, a drum carried by said driven shaft, a brake device upon said driven shaft, and a jack for raising and lowering the wheels with respect to the platform and also with respect to the driven wheels, and means operable from the driver's seat for controlling said movement.

5. In an apparatus of the character described, in combination, a platform adapted to support an automobile, a transverse shaft, driven wheels thereon adapted to coact with the driving wheels of the automobile, a drum carried by said driven shaft, a brake device upon said driven shaft, a jack for raising and lowering the wheels with respect to the platform and also with respect to the driven wheels, and two levers operable from the driver's seat, one of which is adapted to control the movement of the wheels with respect to the platform and the other with respect to the driven wheels.

6. In an apparatus of the character described, in combination, a platform adapted to support an automobile, a transverse shaft, driven wheels thereon adapted to coact with the driving wheels of the automobile, a drum carried by said driven shaft, a brake device upon said driven shaft, a jack for raising and lowering the wheels with respect to the platform and also with respect to the driven wheels, and means operable from the driver's seat for controlling said movement, said means including a toggle adapted to be moved from one side to the other of a dead center position.

In testimony whereof I affix my signature in presence of two witnesses.

PRESTON A. MURRAY.

Witnesses:
 ERNEST T. THOMAS,
 EARLE C. BROOKS.

Copies of this patent may be obtained for five cents each, by addressing the "Commissioner of Patents, Washington, D. C."